(12) United States Patent
Raoul et al.

(10) Patent No.: US 7,629,722 B2
(45) Date of Patent: Dec. 8, 2009

(54) ELECTRIC MOTOR ASSEMBLY DEVICE

(75) Inventors: Philippe Raoul, Fresne la Mere (FR); Gerard Fournier, Ifs (FR); Benoit Bazin, Tinchebray (FR); Stephane Omelezuk, Meslay (FR)

(73) Assignee: ArvinMeritor Light Vehicle Systems - France, Sully-sur-Loire (FR)

( * ) Notice: Subject to any disclaimer, the term of this patent is extended or adjusted under 35 U.S.C. 154(b) by 322 days.

(21) Appl. No.: 11/709,943

(22) Filed: Feb. 22, 2007

(65) Prior Publication Data
US 2007/0200451 A1   Aug. 30, 2007

(30) Foreign Application Priority Data
Feb. 24, 2006   (FR)   ................................. 06 01640

(51) Int. Cl.
*H01R 39/42*   (2006.01)
*H01R 39/38*   (2006.01)
(52) U.S. Cl. .................. 310/238; 310/239; 310/245
(58) Field of Classification Search ......... 310/238–239, 310/245
See application file for complete search history.

(56) References Cited

U.S. PATENT DOCUMENTS

| | | | |
|---|---|---|---|
| 4,404,488 A * | 9/1983 | Herr .......................... | 310/239 |
| 4,596,941 A | 6/1986 | Kluck | |
| 4,613,781 A * | 9/1986 | Sanders ....................... | 310/239 |
| 4,694,214 A * | 9/1987 | Stewart, Sr. .................. | 310/239 |
| 4,866,322 A * | 9/1989 | Baumeister et al. .......... | 310/239 |
| 4,883,998 A * | 11/1989 | Lau ............................ | 310/239 |
| 5,004,943 A * | 4/1991 | Gagneux ..................... | 310/239 |
| 5,495,134 A * | 2/1996 | Rosenblum .................. | 310/239 |
| 6,333,580 B1 * | 12/2001 | Steinbart et al. ............ | 310/239 |
| 6,417,595 B1 * | 7/2002 | Wasson ....................... | 310/220 |
| 6,717,321 B2 * | 4/2004 | Mademba-Sy et al. ...... | 310/239 |
| 7,045,928 B2 * | 5/2006 | Kasdorf ...................... | 310/239 |
| 7,215,057 B2 * | 5/2007 | Lehir et al. ................. | 310/239 |

FOREIGN PATENT DOCUMENTS

| | | |
|---|---|---|
| DE | 33 28 683 | 2/1985 |
| DE | 3731409 | * 4/1989 |

(Continued)

OTHER PUBLICATIONS

French Search Report dated Oct. 19, 2006.
French Search Report dated Jan. 5, 2006.

*Primary Examiner*—Burton Mullins
(74) *Attorney, Agent, or Firm*—Carlson, Gaskey & Olds

(57) ABSTRACT

An electric motor assembly device includes a carrier member with a central passage that receives a rotor shaft with a commutator. Brushes secured onto flexible, brush holders urge the brushes towards the central passage into a contact position with the commutator. The carrier member has mechanical elements for restraining the brush holders in an assembly position for assembly where the brushes clear the central passage and are protected against impact by the carrier member. This arrangement allows the rotor shaft to be introduced into the central passage of the carrier member without a risk of damaging the brushes. The brush holders are easily released automatically from the mechanical elements on the electric motor assembly device to bring the brushes into the contact position.

10 Claims, 6 Drawing Sheets

FOREIGN PATENT DOCUMENTS

| | | | |
|---|---|---|---|
| DE | 4241404 | * | 8/1994 |
| DE | 101 48 705 | | 4/2003 |
| EP | 0101546 | * | 2/1984 |
| EP | 0 244 252 | | 11/1987 |
| FR | 2 814 868 | | 4/2002 |
| FR | 2 865 865 | | 8/2005 |
| GB | 2 094 561 | | 9/1982 |
| GB | 2 299 218 | | 9/1996 |

* cited by examiner

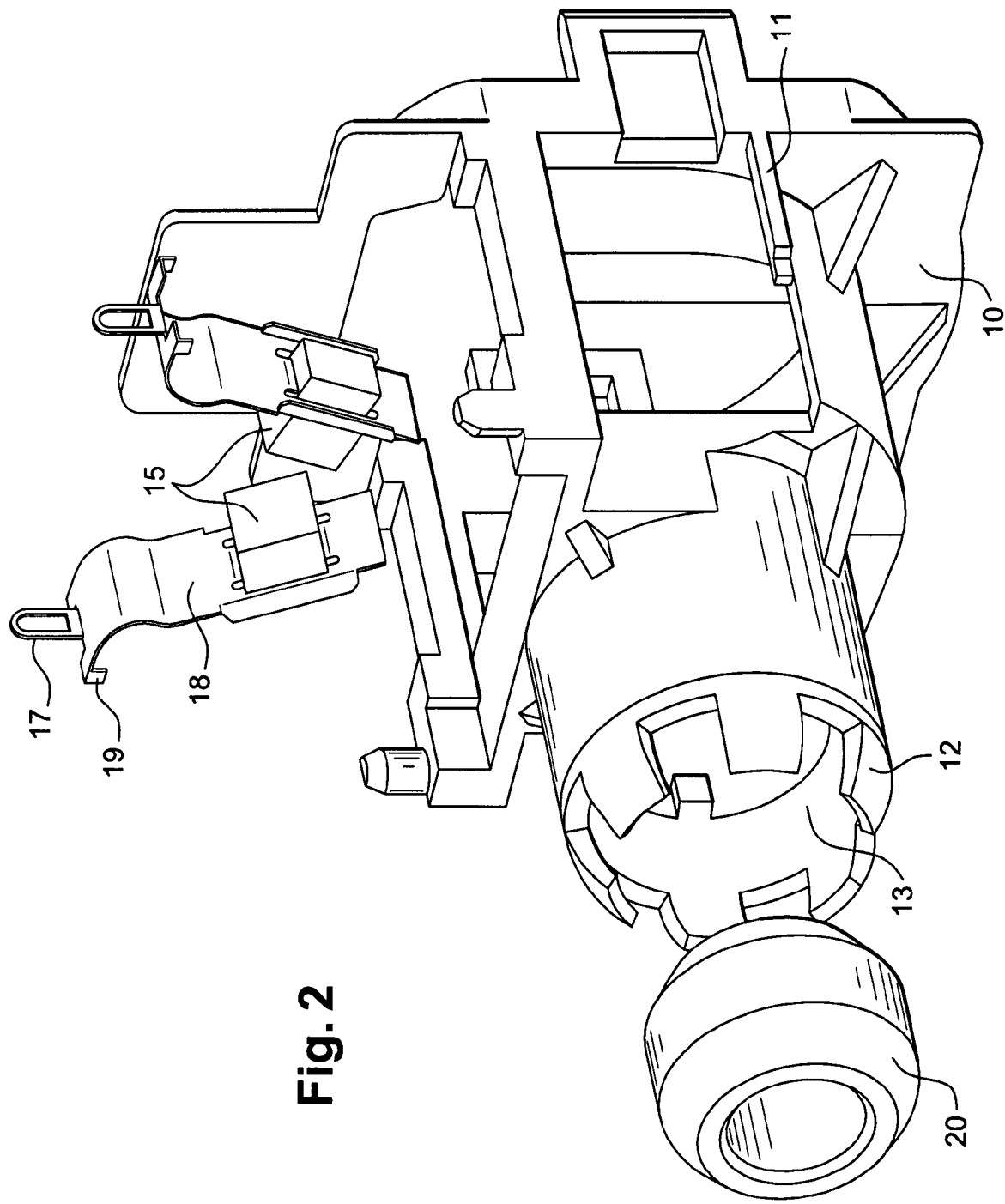

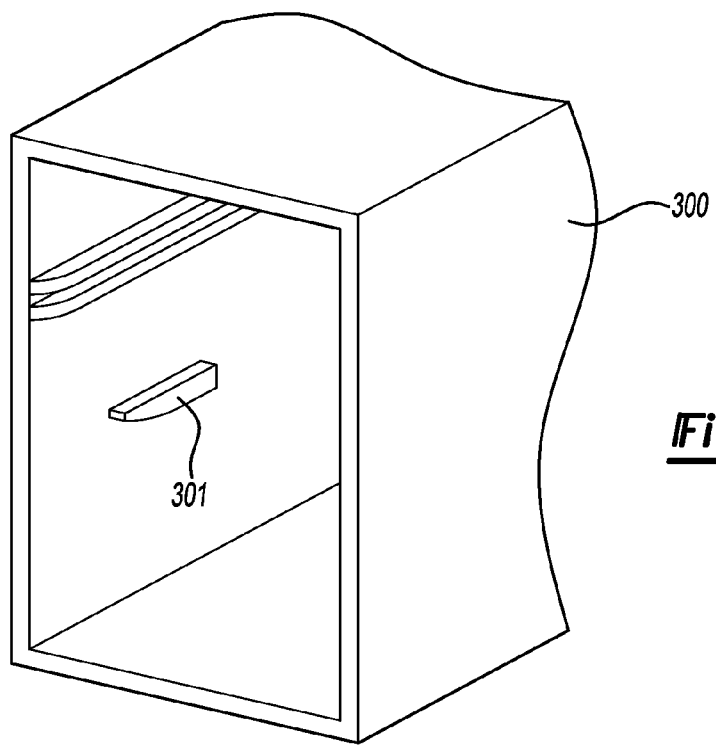
Fig-6
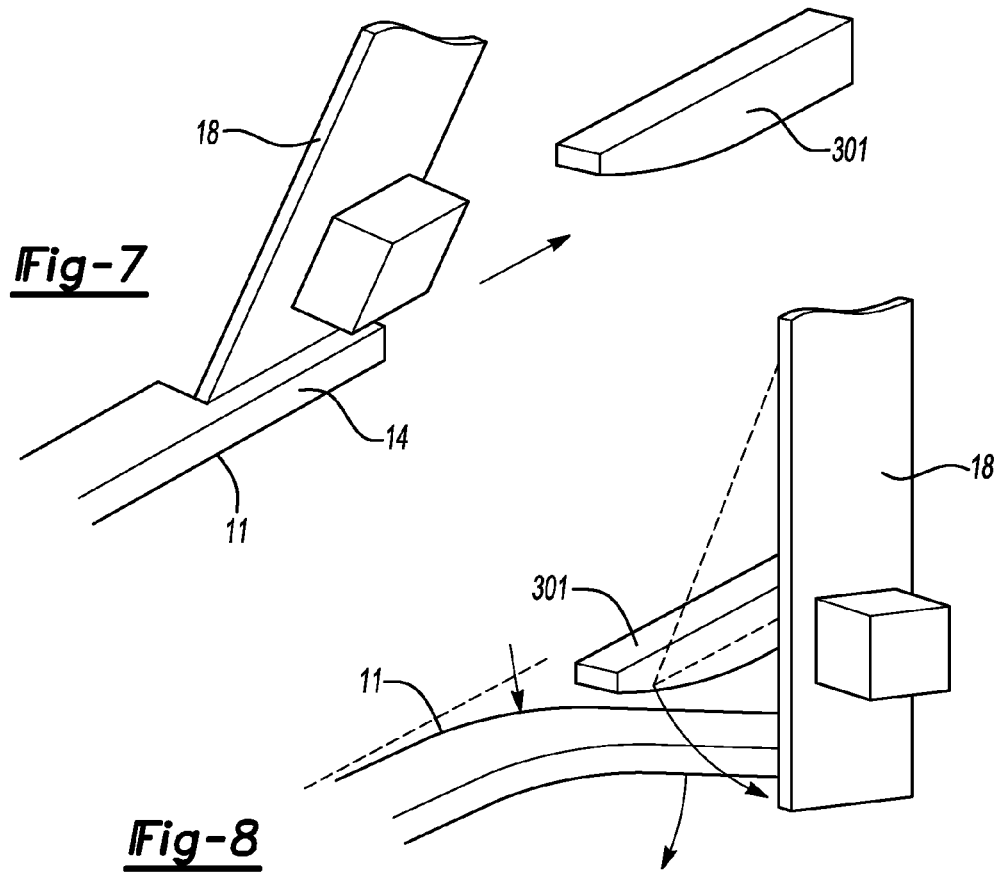
Fig-7
Fig-8

ELECTRIC MOTOR ASSEMBLY DEVICE

REFERENCE TO RELATED APPLICATION

This application claims priority to French Patent Application FR 06 01 640 filed on Feb. 24, 2006.

BACKGROUND OF THE INVENTION

The present invention relates generally to an electric motor assembly device, in particular for assembling a rotor with a commutator housing. The invention also provides a method for assembling the rotor into a stator using the electric motor assembly device.

In particular, the invention generally relates to an electric motor designed to drive automobile vehicle equipment, such as a window regulator, a sliding roof or a device for operating a seat, for example.

French patent 2,814,868 discloses such an electric motor including a stator and a commutator mounted on a rotor.

A commutator conventionally includes a commutator ring with a series of conducting segments on a periphery. The commutator ring is designed to be mounted integral with a rotor shaft. An electric motor generally includes a stator frame and the rotor shaft rotatively mounted in the stator. The electric motor also includes windings integral with the rotor shaft. Each winding is electrically connected to diametrically opposing commutator segments.

The commutator is generally mounted in a commutator housing integral with the stator after assembly. The commutator housing includes a carrier with a central opening designed to receive the commutator and to allow the rotor shaft to pass through the carrier of the commutator housing. The carrier is made of an insulating material, such as, for example, plastics material.

The commutator housing also includes at least two brushes that are diametrically opposed with respect to the commutator. The brushes are designed to make contact with the commutator segments during rotation of the commutator segments integral with the rotor shaft. The brushes are electrically connected to a source of electrical power.

When the electric motor is being assembled, and in particular when the commutator is being assembled into the commutator housing, the brushes must be kept spaced from their point of contact with the commutator segments. After this, when assembly is completed, the brushes need to be brought into contact with the commutator segments. The mechanical contact between the brushes and commutator segments needs to be guaranteed to insure a good electrical contact with the windings via the commutator segments.

Thus, the brushes need to be held in a first position (an assembly position) when the commutator is being assembly. Then, the brushes need to be held in a second position guaranteeing contact (a contact position) to ensure electricity is supplied to the commutator segments.

Additionally, while the electric motor is being assembled, the rotor shaft is not always suitably guided when inserted through the commutator housing. The rotor shaft can strike against contact surfaces of the brushes, even when the brushes are in the assembly position (the position where the brushes are spaced from a passage for the rotor shaft).

A known commutator housing is, for example, installed on motors sold by the assignee and identified by reference 420143, which includes a brush locking device. The commutator housing of the prior art is shown diagrammatically in FIGS. 1a and 1b, which respectively show the brushes in the assembly position and in the contact position.

The commutator housing includes a plastic housing carrier 1 on which two cages 8 are provided. Each cage 8 receives a brush 5, and each brush 5 includes an electrical connection constituted by a copper pigtail 6 (only one connection is illustrated). The commutator housing shown does not include the commutator, but has a central opening 2 designed to receive a commutator ring and a rotor shaft passing therethrough.

As shown in FIG. 1a, the brushes 5 are retracted to an assembly position (or a retracted position) behind the cages 8 at a side opposite the central opening 2 designed to receive the commutator. A spring 9 keeps each brush 5 in the assembly position when the rotor shaft is mounted through the central opening 2. The cages 8 protect the brushes 5 against possible impact with a badly guided rotor.

In the contact position, shown in FIG. 1b, the brushes 5 are housed inside the cages 8. The spring 9 exerts pressure on a back face of the brushes 5 to urge the brushes 5 towards the commutator.

Thus, the spring 9 has the dual function of keeping the brush 5 in the assembly position, and then in the contact position. The spring 9 nevertheless constitutes a key part that is separate from the housing carrier 1. The housing carrier 1 needs to be manufactured separately and then assembled onto the commutator housing. Further, the point where the spring 9 bears on the brush 5 needs to be located on top of or behind the brush 5 to ensure the brush 5 is put into the assembly position and then the contact position, requiring a specific operation which is frequently manual and costly. Further, electrical connection of the brush 5 is also insured by the copper pigtail 6, which is an additional part.

Multiplying the number of parts needed for correct operation of the commutator housing increases costs and complicates its manufacture. Further, shifting the brushes 5 from the assembly position increases its cost and requires a specific assembly operation.

Further, U.S. Pat. No. 4,596,941 discloses a commutator housing including a carrier with a central opening, a commutator and brushes secured onto flexible brush holders. In the assembly position, the brush holders are restrained by holding pins integral with the carrier. Local deformation of the carrier pushes a release pin to release the brush holders from the assembly position. The release pin raises the brush holder, then clears a restraining abutment and returns (under spring recall) into an operating position against the commutator.

The commutator housing does not adequately protect the brushes in the assembly position. In effect, even when the brushes are spread apart, the rotor shaft can strike the contact surface of the brushes while the rotor shaft is being introduced through the opening in the commutator housing. Further, shifting the brushes from the assembly position to a contact position always requires the manual intervention of an operator to push in the release pin.

There is consequently a need for an assembly device which protects brush surfaces in an assembly position, and which allows brushes to move from the assembly position to a contact position in a simple, efficacious and automatic manner.

SUMMARY OF THE INVENTION

The invention provides an electric motor assembly device including a carrier member having a central passage adapted to receive a rotor shaft provided with a commutator. The central passage is substantially circular. The electric motor assembly device includes brushes secured onto flexible brush holders that urge the brushes towards the central passage into a contact position with the commutator. The carrier member includes mechanical elements for retaining the brush holders in an assembly position outside of the central passage. The brushes are protected by the carrier member when in the assembly position.

In various embodiments, the electric motor assembly device can include one or several of the following features. The electric motor assembly device can include a partly-spherical bearing member for guiding the rotor shaft. The carrier member can include a mechanical feature for retaining the partly-spherical bearing member. The mechanical feature is constituted by a reduced diameter portion of the central passage in the carrier member. A printed circuit to which the brush holder members are connected can be secured to the carrier member. The brush holders can be adapted to electrically supply the brushes. The printed circuit can include an insulating support that is of a one-piece construction with the carrier member. Mechanical elements for retaining the brush holders in the assembly position can be stem or finger members which extend substantially parallel to an axis of the central passage in the carrier member. The stem or finger members for retaining the brush holders are flexible in a direction substantially parallel to the brush holders.

The invention also provides a direct current electric motor including the above electric motor assembly device. The direct current electric motor includes the rotor shaft extending in the central passage of the carrier member and an outer casing including shapings for releasing the mechanical elements that restrain the brush holders.

The invention also provides a method for mounting the rotor shaft in the outer casing of the electric motor. The method includes the steps of supplying the above described electric motor assembly device with the brush holders maintained outside the central passage of the carrier member and introducing the rotor shaft provided with the commutator into the central passage of the carrier member. The brushes are protected by the carrier member. The method further includes the steps of placing the electric motor assembly device along with the rotor shaft into the outer casing that includes shapings that are adapted to actuate the mechanical elements that retain the brush holders to release the brush holders from the assembly position.

Further characteristics and advantages of the invention will become more clear from the detailed description which follows of some embodiments of the invention, provided solely by way of example and with reference to the attached drawings.

BRIEF DESCRIPTION OF THE DRAWINGS

FIG. 2 is a diagrammatic exploded view of an assembly device according to the invention;

FIG. 6 is an internal view of an outer casing including shapings;

FIG. 7 is a view of the shapings and the mechanical elements; and

FIG. 8 is a view of the shapings uring the mechanical elements downwards.

DETAILED DESCRIPTION OF PREFERRED EMBODIMENTS

The assembly device of the invention includes a carrier body having a central passage for a rotor shaft with a commutator. The assembly device also includes brush holders on which brushes are fixed. The brush holders are flexible and urge the brushes towards the central passage of the carrier body in a contact position where the brushes contact the commutator. The carrier body includes mechanical members that retain the brush holder components in an assembly position away from the central passage.

Thus, the rotor shaft can penetrate inside the central passage of the carrier body without damaging the brushes which, being maintained in the assembly position outside of the central passage, are protected by the carrier body.

Further, the brush holders urge the brushes towards the contact position of contact so that the brush holders suffice to release the brush holders from the mechanical members of the assembly device to bring the brushes into the contact position. The operation can be performed automatically while a motor is being assembled, simplifying manufacture of the motor.

In particular, the mechanical members for restraining the brush holders can be operated by shapings on a motor stator casing. The assembly device according to the invention consequently does not require specific elements to release the brush holders from the assembly position, simplifying motor assembly.

The assembly device according to the invention will be described with reference to FIG. 2. FIG. 2 shows a carrier member 10 having a central passage 13 that is substantially cylindrical. The central passage 13 has a shape and dimension such that the central passage 13 is suitable for receiving a rotor shaft provided with a commutator. Assembling the rotor shaft into the assembly device will be described in detail below.

The carrier member 10 is of an insulating material, for example, a plastics material. The carrier member 10 can be produced by any appropriate molding technique.

The carrier member 10 is designed to be inserted inside a casing of the motor with integral speed reduction gearing. The carrier member 10 consequently has a substantially rectangular outer shape in which the central passage 13 is provided. In particular, the outer shape of the carrier member 10 is chosen depending on the specific shape of the casing into which the carrier member 10 is to be fitted.

Figure 1A:
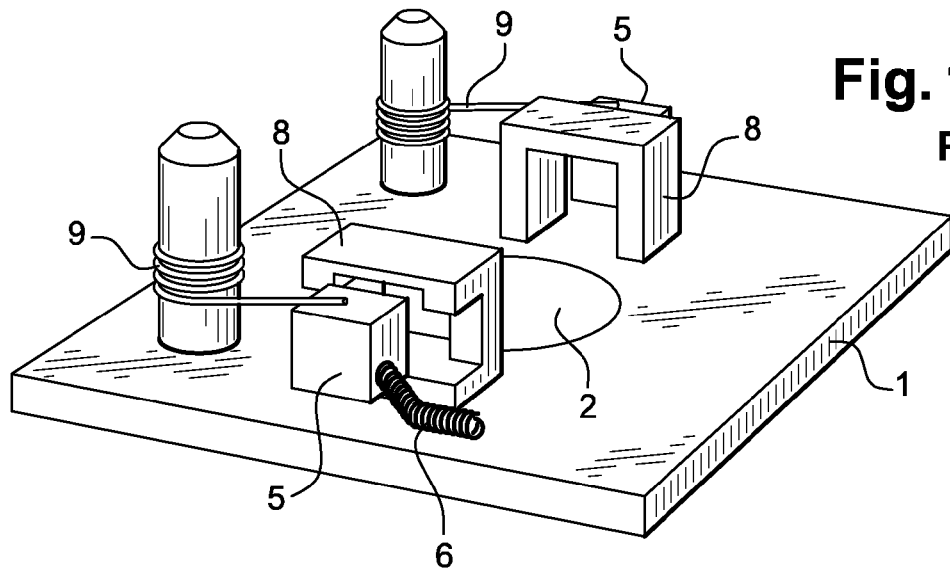
FIG. 1a, which has already been described, is a diagrammatic view of a commutator housing according to the prior art with brushes in an assembly position.
Figure 1B:
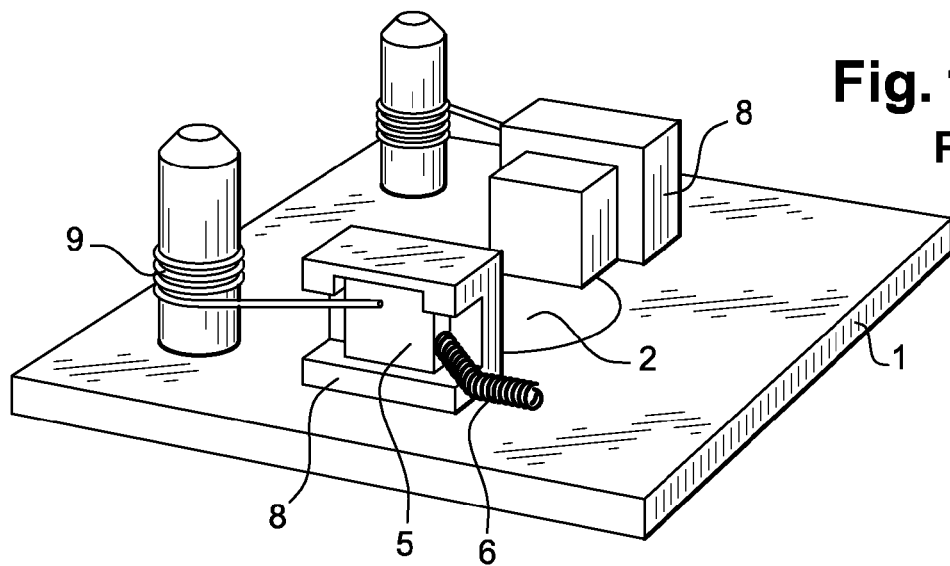
FIG. 1b, already described, shows a prior art commutator housing with the brushes in a contact position.
Figure 3:
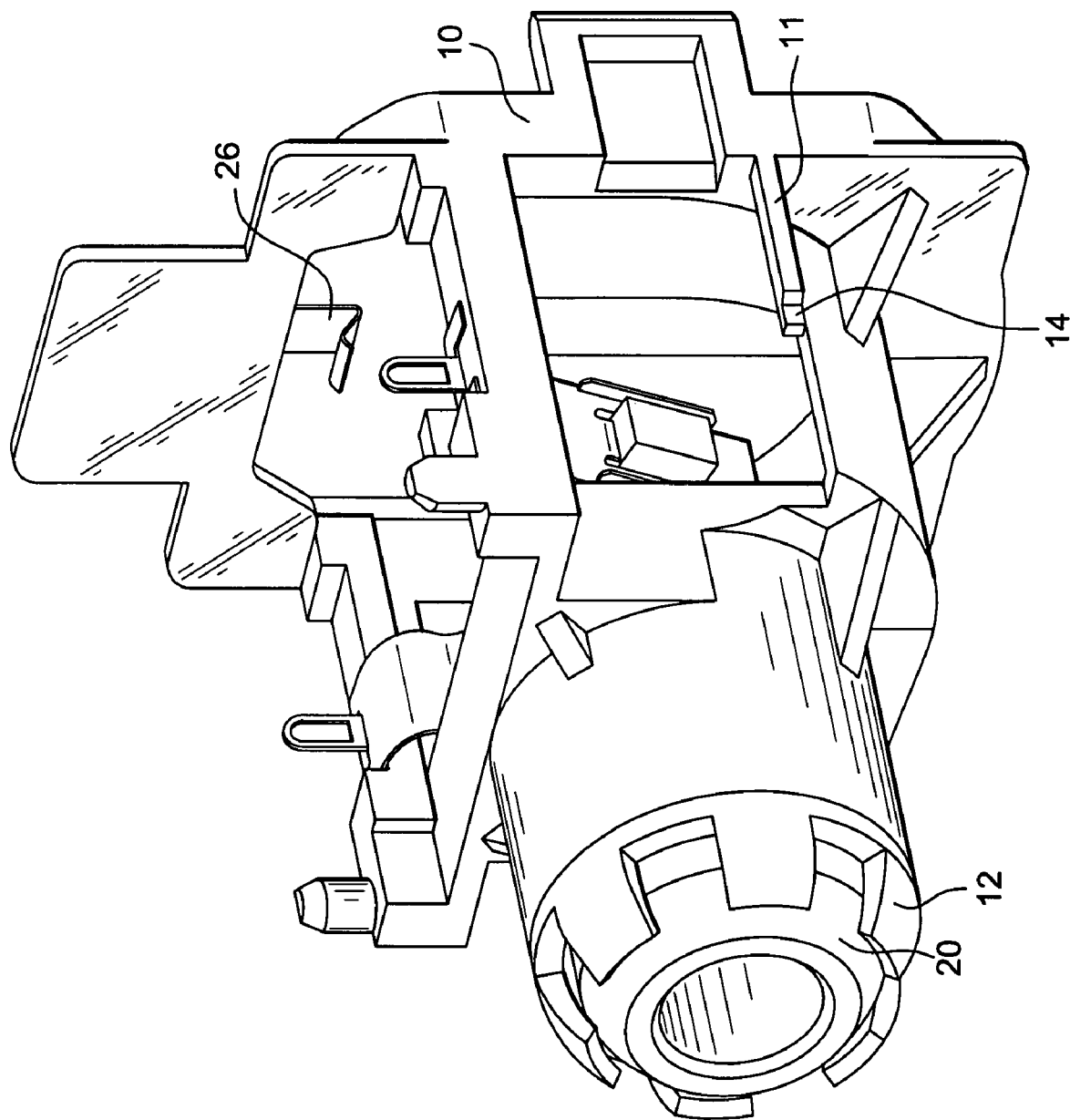
FIG. 3 is a diagrammatic view of the assembly device of FIG. 2 once assembled, with brushes in the contact position.
Figure 4:
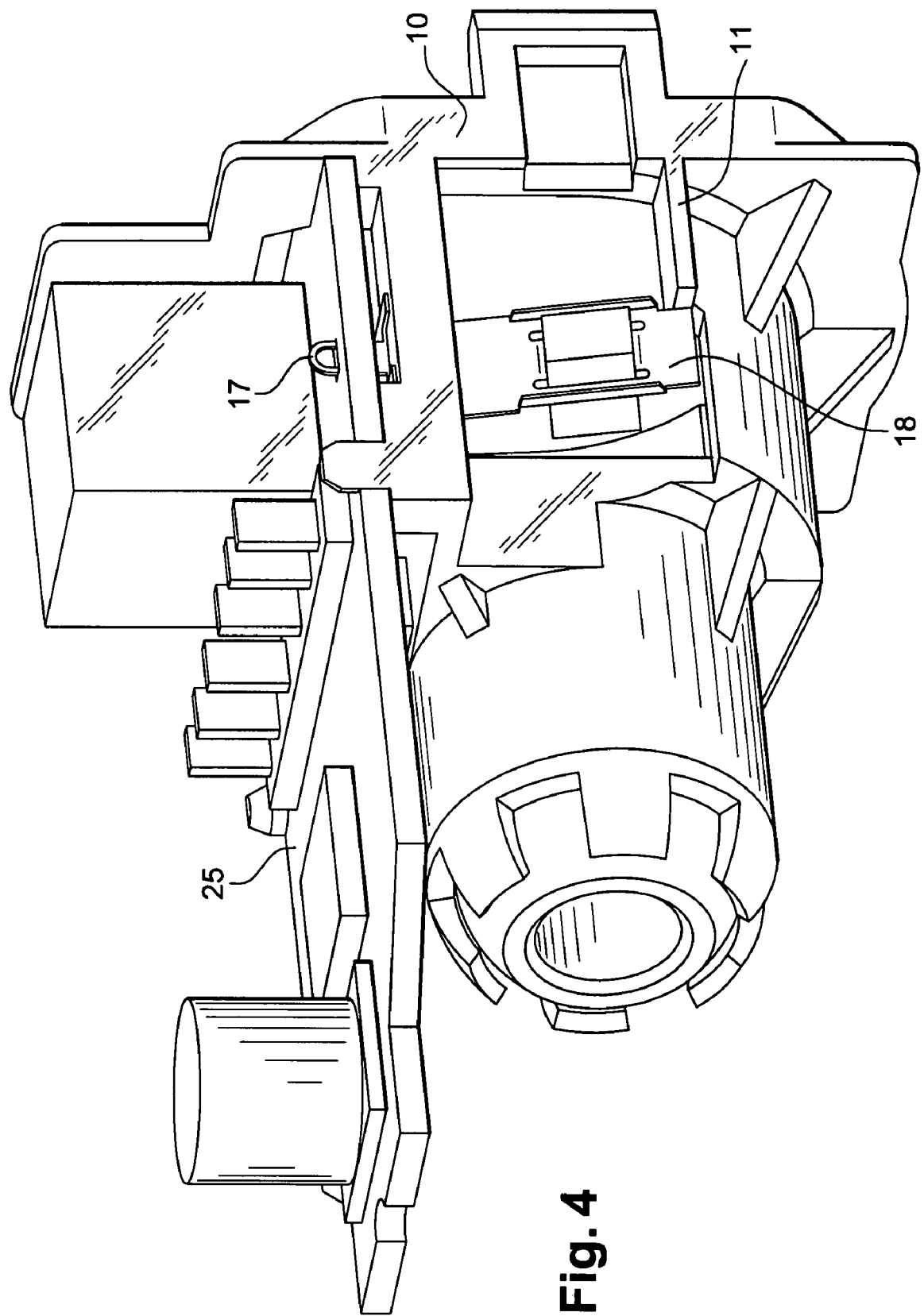
FIG. 4 shows the assembly device of FIG. 2 assembled with the brushes in the assembly position, and with a printed circuit board.

FIG. 2 also shows brushes 15 each fixed onto a brush holder 18. The brush holders 18 are flexible laminae having a free end and an end designed to be engaged with the carrier member 10. For example, one of the ends the brush holders 18 can have a hook-shaped end 19 that engage onto a cross member of the carrier member 10, as shown in FIG. 3. The hook-shaped end 19 of the brush holders 18 can also provide an electrical connection loop 17 for connection to an electric power track of a printed circuit board 25, as illustrated in FIG. 4.

The brush holders 18 can be constituted by a conductive material, such as copper laminae, and are thus suitable for electrically supplying the brushes 15 without the need for additional connection feature.

The brushes 15 are fixed near the free end of each flexible brush holder 18. The brush holders 18 are adapted to urge the brushes 15 towards the central passage 13. In other words, the the end of the brush holder 18 integral with and secured to the carrier member 10 is located such that each flexible brush holder 18 will bring the brush 15 it carries into the contact position with the commutator (which will be inserted through the central passage 13).

FIG. 2 also shows a partly-spherical bearing member 20 designed to be fitted into the carrier member 10. The partly-spherical bearing member 20 has a through passage adapted to receive the rotor shaft and that allows the rotor shaft to be guided while being inserted through the carrier member 10. The through passage then guides the rotor shaft while at the same time allowing a certain degree of play during insertion of the rotor shaft into the stator casing. The carrier member 10 includes a mechanical feature 12 for entrapping the partly-spherical bearing member 20. In particular, the central passage 13 of the carrier member 10 has a reduced diameter portion that terminates in a series of castellations or tabs for retaining the partly-spherical bearing member 20.

FIG. 3 shows the assembly device of the invention with the brush holders 18 engaged onto the carrier member 10. The partly-spherical bearing member 20 is retained by the mechanical features 12 of the carrier member 10. In the absence of any restraint, the brush holders 18 keep the brushes 15 inside the central passage 13. When the rotor shaft with the commutator is fitted into the central passage 13 of the carrier member 10, the brushes 15 will indeed have been urged against the commutator by the flexible brush holders 18, thereby insuring good electrical contact.

FIG. 3 shows the brushes 15 in the contact position, hinder mounting of the rotor shaft. The carrier member 10 consequently includes mechanical elements 11 provided with an abutment 14 for the brush holders 18 when in the assembly position (spaced apart position) outside of the central passage 13 (in other words, in a position of the commutator, as illustrated in FIG. 4).

The mechanical elements 11 are integral with the carrier member 10. The mechanical elements 11 can be of a one piece construction with the carrier member 10, for example obtained by moldings on the carrier member 10. One mechanical element 11 is provided per brush holder 18.

FIG. 4 shows the brush holders 18 in the assembly position onto the commutator. The mechanical elements 11 are stem or finger members which extend substantially parallel to an axis of the central passage 13 of the carrier member 10. The end of the mechanical elements 11 act as an abutment at the free end of the brush holder 18. The flexible brush holders 18 are thus held in a spaced apart position outside the central passage 13 of the carrier member 10 by abutment against the mechanical elements 11.

In particular, it can be clearly seen in FIG. 4 that when the brushes 15 are in the assembly position, the brushes 15 are protected by the carrier member 10 from possible impact with the rotor shaft.

The mechanical elements 11 that restrain the brush holders 18 are flexible in a direction substantially perpendicular to a longitudinal axis. In particular, the mechanical elements 11 are flexible in a direction substantially parallel to the brush holders 18. Thus, a pressure exercised on the abutment end of the mechanical elements 11, substantially parallel to the brush holders 18, releases the brush holder 18 from abutment with the mechanical element 11. The flexible brush holders 18 will now return, under spring recall, to a rest position. In other words, the brush holders 18 will bring the brushes 15 inside the central passage 13 of the carrier member 10 so the brushes 15 contact the commutator, as illustrated in FIG. 3.

FIG. 4 also shows the printed circuit board 25 secured to the carrier member 10. The printed circuit board 25 can be secured onto the carrier member 10 by sliding with abutment onto the carrier member 10, the printed circuit board 25 being held laterally between abutments provided on the carrier member 10.

In a manner known per se, the printed circuit board 25 includes the electronic and electrical components for controlling and regulating the motor for which the assembly device is intended. The printed circuit board 25 can thus include an electrical relay, electrical supply terminals, an electronic unit, memories, position sensors, and other components. Although this is not shown, it would be possible to make the insulating support of the printed circuit board 25 in one piece with the carrier member 10.

The brush holders 18 are connected to the printed circuit board 25. For example, the electrical connection loops 17 pass through the printed circuit board 25 and electrically connect with electrical power tracks. Alternatively, the electrical connection between the brush holders 18 and the printed circuit board 25 can be provided by contact pressure between the hook-shaped end 19 of the brush holder 18 and the electrical supply tracks of the printed circuit board 25. This solution has the advantage of obviating an additional operation of soldering to establish contact between the brush holder 18 and the printed circuit board 25.

Although not shown, the brush holders 18 can also be integral with the printed circuit board 25 prior to assembly of the device according to the invention. In particular, the brush holders 18 can be directly soldered onto the printed circuit board 25 and positioned on the carrier member 10 at the time when the printed circuit board 25 is being secured onto the carrier member 10.

Figure 5:
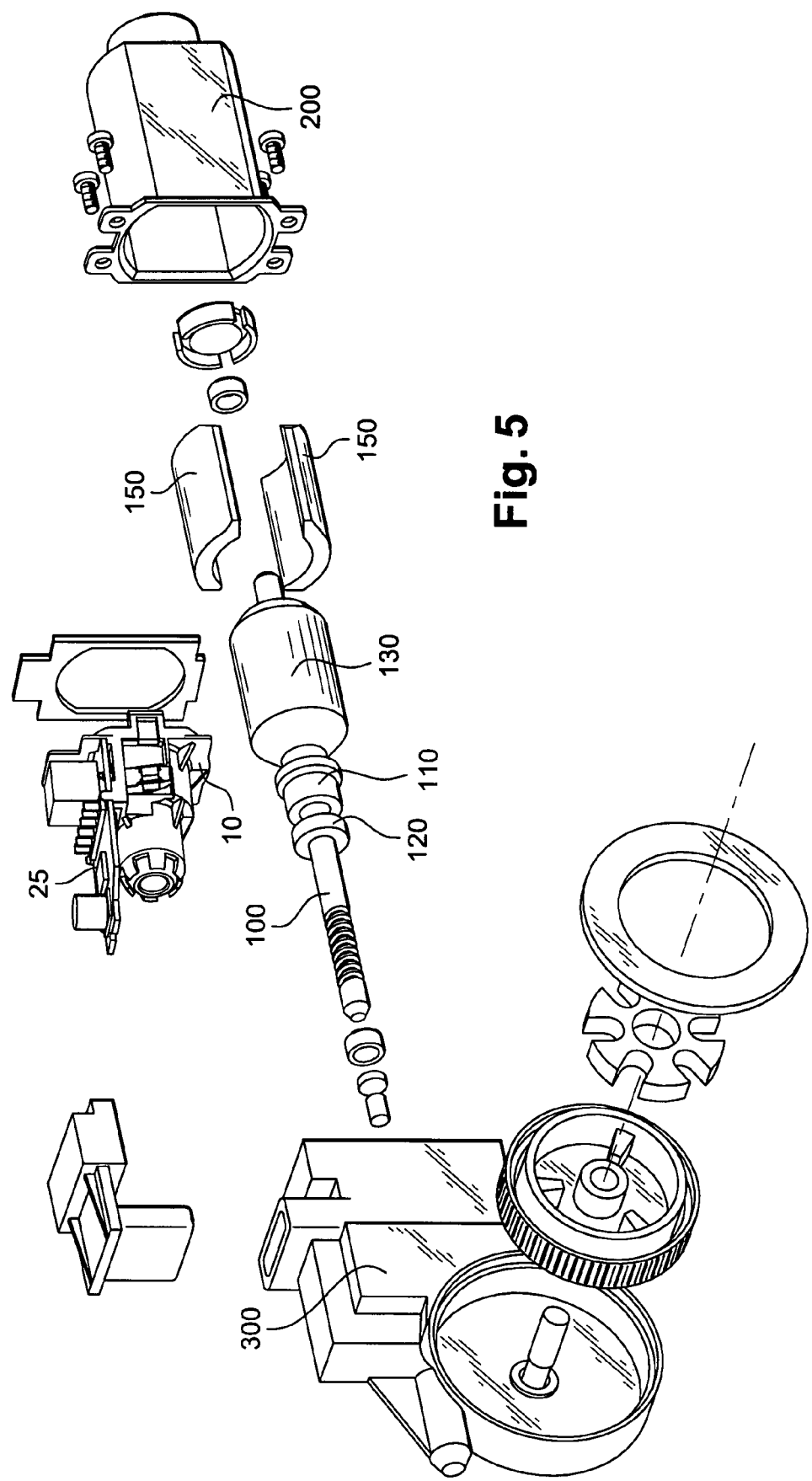
FIG. 5 is an exploded view of an electric motor including the assembly device according to the invention.

The assembly device illustrated in FIG. 4 forms an assembly which can be made in ways differing from those described in the description of FIGS. 2 and 3, depending on the embodiment. FIG. 5 is an exploded view of an electric motor including an assembly device according to the invention. FIG. 5 shows the assembly device according to the invention with the printed circuit board 25 assembled onto the carrier member 10. The brushes 15 are maintained in the assembly position, in other words, spaced apart from the central passage 13 in the carrier member 10.

FIG. 5 also shows a rotor shaft 100 including a commutator 110 and a magnetic ring 120 that generates a rotating flux that allows a direction of rotation and a speed of the motor to be detected, as is known per se. The rotor shaft 100 also has windings 130 connected to segments of the commutator 110.

FIG. 5 also shows a stator casing 200 designed to receive the rotor shaft 100 and permanent magnets 150, along with the assembly device according to the invention. In effect, first, the rotor shaft 100 is introduced into the central passage 13 of the carrier member 10 of the assembly device according to the invention before being introduced into stator casing 200.

The outer casing carrying the electronic components and the outer casing carrying the speed reduction gear can have specific shapings 301 (such as rod members), arranged inside and visible in FIG. 6, for actuating the mechanical elements 11 that restrain the brush holders 18 while the assembly device is being introduced along with the rotor shaft 100 into the outer casing 300. FIG. 7 shows a view of the shapings 301 and the mechanical elements 11. The rod members on the outer casing change the position of the restraining elements 11 for the brush holders 18, thereby releasing the brush holders 18 from their abutment with the restraining elements 11. The brushes 15 can then pass from the assembly position to the contact position where the brushes 15 contact the commutator in an operation, which is part of the assembly operation for the rotor shaft 100 (fitted with the assembly including the housing, the commutator 110 and the printed circuit board 25) into the casing.

Once the rotor shaft 100 has been introduced into the casing, shapings 301 on the stator can keep the mechanical members 11 bent (as shown in FIG. 8) and remote from their position of abutment with the brush holders 18, avoiding any risk of brush holders 18 returning to the assembly position, for example due to impact.

The outer casing 300 for the mechanical parts together with the rotor shaft 100 and the assembly device according to the invention is assembled into the stator casing 200, for example for use as a window regulator motor for a vehicle.

The shapings 301 adopted for operating on the mechanical elements 11 of the brush holders 18 for bringing the brushes 15 to the contact position with the commutator 110 can be provided in the outer casing of the stator rather than in the outer casing 300 for the mechanical parts. The brushes 15 can then change over from the assembly position to the contact position with the commutator 110 in an operation which is part of the operation of assembling the stator with the stator casing.

In particular, the shifting of the brushes 15 from the assembly position to the contact position does not require the intervention of an operator, but occurs automatically thanks to the specific shapings 301 provided in the stator casing while the motor is being assembled.

The present invention is obviously not limited to the embodiments described by way of example. Thus, two brushes 15 and brush holders 18 have been shown, but motors do exist having three, four or more brushes. The assembly device of the invention can then be readily adapted if there are more than two brush holders 18. Further, the shapes and dimensions of the carrier member 10 can vary, depending on the envisaged applications.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A direct current electric motor comprising:
    an assembly device including a carrier member having a substantially cylindrical central passage adapted to receive a rotor shaft provided with a commutator, and brushes that are each secured onto a flexible brush holder member that urges the brushes towards the substantially cylindrical central passage and into a position of contact with the commutator, wherein the carrier member includes mechanical elements for retaining the flexible brush holders in an assembly position outside of the substantially cylindrical central passage, and the brushes are protected by the carrier member when in the assembly position;
    the rotor shaft extending in the substantially cylindrical central passage; and
    an outer casing including shapings for releasing the mechanical elements.

2. The direct current electric motor according to claim 1, wherein the assembly device further including a partly-spherical bearing member for guiding the rotor shaft, wherein the carrier member includes a mechanical feature for retaining the partly-spherical bearing member.

3. The direct current electric motor according to claim 2, wherein the mechanical feature is constituted by a reduced diameter portion of the substantially cylindrical central passage in the carrier member.

4. The direct current electric motor according to claim 1, wherein the assembly device further including a printed circuit board secured to the carrier member, wherein the flexible brush holders are connected to the printed circuit board.

5. The direct current electric motor according to claim 4, wherein the flexible brush holder members are adapted to electrically supply the brushes.

6. The direct current electric motor according to claim 4, wherein the printed circuit board includes an insulating support that is of a one-piece construction with the carrier member.

7. The direct current electric motor according to claim 1, wherein the mechanical elements for retaining the flexible brush holder members in the assembly position are stem or finger members which extend substantially parallel to an axis of the substantially cylindrical central passage in the carrier member.

8. The direct current electric motor according to claim 7, wherein the stem or finger members are flexible in a direction substantially parallel to the flexible brush holders.

9. An electric motor assembly device comprising:
    a carrier member having a substantially cylindrical central passage adapted to receive a rotor shaft provided with a commutator; and
    brushes that are each secured onto a flexible brush holder that urges the brushes towards the substantially cylindrical central passage and into a position of contact with the commutator, wherein the carrier member includes mechanical elements for retaining the flexible brush holders in an assembly position outside of the substantially cylindrical central passage, and the brushes are protected by the carrier member when in the assembly position, the mechanical elements for retaining the flexible brush holders in the assembly position are stem or finger members which extend substantially parallel to an axis of the substantially cylindrical central passage in the carrier member, and wherein the stem or finger members are flexible in a direction substantially parallel to the flexible brush holders.

10. A method for mounting a rotor shaft in a casing of an electric motor, the method comprising the steps of:
    supplying an assembly device including a carrier member having a substantially cylindrical central passage adapted to receive a rotor shaft provided with a commutator, and brushes that are each secured onto a flexible brush holder that urges the brushes towards the substantially cylindrical central passage and into a position of contact with the commutator, wherein the carrier member includes mechanical elements for retaining the flexible brush holders in an assembly position outside of the substantially cylindrical central passage, the brushes are protected by the carrier member when in the assembly position, and the flexible brush holders are maintained outside the substantially cylindrical central passage;
    introducing the rotor shaft provided with the commutator into the substantially cylindrical central passage, wherein the brushes are protected by the carrier member; and
    placing the assembly device along with the rotor shaft into an outer casing that includes shapings adapted to actuate the mechanical elements to release the flexible brush holders from the assembly position.

* * * * *